United States Patent
Freeze-Skret

(10) Patent No.: US 9,432,390 B2
(45) Date of Patent: Aug. 30, 2016

(54) SCENE IDENTIFICATION SYSTEM AND METHODS

(71) Applicant: PROMETHEUS SECURITY GROUP GLOBAL, INC., Austin, TX (US)

(72) Inventor: Jeremy Freeze-Skret, Dripping Springs, TX (US)

(73) Assignee: Prometheus Security Group Global, Inc., Austin, TX (US)

( * ) Notice: Subject to any disclaimer, the term of this patent is extended or adjusted under 35 U.S.C. 154(b) by 0 days.

(21) Appl. No.: 14/587,733

(22) Filed: Dec. 31, 2014

(65) Prior Publication Data

US 2015/0188938 A1 Jul. 2, 2015

Related U.S. Application Data

(60) Provisional application No. 61/922,188, filed on Dec. 31, 2013.

(51) Int. Cl.
  *H04L 29/06* (2006.01)

(52) U.S. Cl.
  CPC .......... *H04L 63/1425* (2013.01); *H04L 63/08* (2013.01)

(58) Field of Classification Search
  CPC ....................................................... H04L 63/08
  See application file for complete search history.

(56) References Cited

U.S. PATENT DOCUMENTS

| | | | |
|---|---|---|---|
| 6,005,936 A | 12/1999 | Shimizu et al. | |
| 7,030,753 B2 | 4/2006 | Hentz et al. | |
| 7,804,984 B2 | 9/2010 | Sidlauskas et al. | |
| 8,130,419 B2 | 3/2012 | Kuyper-Hammond et al. | |
| 8,171,564 B2 | 5/2012 | Rouse et al. | |
| 8,189,786 B2 | 5/2012 | Hauge et al. | |
| 8,416,848 B2 | 4/2013 | Gordon et al. | |
| 8,490,009 B2 | 7/2013 | Takami | |
| 8,522,008 B2 | 8/2013 | Doukhvalov et al. | |
| 2003/0151507 A1* | 8/2003 | Andre | B60R 25/102 340/539.13 |
| 2004/0085445 A1 | 5/2004 | Park | |
| 2004/0085446 A1 | 5/2004 | Park | |
| 2008/0091605 A1* | 4/2008 | Hughes | G06F 21/31 705/51 |
| 2008/0148391 A1* | 6/2008 | Nakamura | H04L 65/1066 726/17 |
| 2008/0198018 A1* | 8/2008 | Hartley | H04M 1/0254 340/572.4 |
| 2008/0256459 A1* | 10/2008 | Sekiya | G06F 21/32 715/741 |
| 2010/0031032 A1* | 2/2010 | Ametsitsi | H04L 67/18 713/159 |
| 2010/0037280 A1 | 2/2010 | Nishimura | |
| 2010/0110308 A1 | 5/2010 | Nicholson et al. | |
| 2010/0150010 A1* | 6/2010 | Wakuda | H04L 43/0847 370/252 |
| 2010/0246816 A1 | 9/2010 | Thomas et al. | |
| 2012/0016596 A1* | 1/2012 | Kubo | G06F 21/32 702/19 |
| 2012/0195425 A1 | 8/2012 | Kim et al. | |
| 2013/0117572 A1* | 5/2013 | Berczes | H04L 9/3247 713/178 |
| 2013/0156185 A1 | 6/2013 | Kim et al. | |
| 2013/0265422 A1 | 10/2013 | Ho et al. | |
| 2013/0340048 A1* | 12/2013 | Sebastian | H04L 63/08 726/4 |
| 2013/0343455 A1* | 12/2013 | Yamamoto | H04N 19/00533 375/240.03 |
| 2014/0067679 A1* | 3/2014 | O'Reilly | G06F 21/32 705/44 |
| 2014/0104103 A1* | 4/2014 | Enge | G01S 19/215 342/357.64 |
| 2014/0149294 A1* | 5/2014 | Leevendig | G06Q 20/02 705/71 |

* cited by examiner

*Primary Examiner* — Izunna Okeke
*Assistant Examiner* — Ali Shayanfar
(74) *Attorney, Agent, or Firm* — Norton Rose Fulbright US LLP

(57) ABSTRACT

Certain embodiments are directed to a system for high security delivery of real time video containing an authentication signature or unique identifier.

16 Claims, 4 Drawing Sheets

SCENE IDENTIFICATION SYSTEM AND METHODS

This application claims priority to and is a non-provisional application of U.S. Provisional Application Ser. No. 61/922,188 filed Dec. 31, 2013, which is incorporated herein by reference in its entirety.

BACKGROUND

Certain embodiments relate to the field of monitoring systems and devices. Certain aspects are directed to authentication of a scene by insertion of authentication information into the video signal and subsequent verification of the inserted information.

Video surveillance systems play an important role in many different areas such as crime prevention, business management, and traffic monitoring. Surveillance systems can be found almost everywhere such as banks, casinos, airports, military installations, and stores. Due to better resolution and output quality, there is a growing trend of replacing analog cameras by digital cameras in the surveillance field. In a digital video surveillance system, network- or IP-based cameras are used instead of traditional analog cameras, which capture images and convert to digital formats right away and transmit the video data to a network-based video recorder (NVR) or video viewing station over a network, typically over Ethernet under IP protocol.

Although these network- or IP-based surveillance systems are gaining popularity, there are some shortcomings. One issue concerns security. Because video data from the IP-based cameras is sent over a shared network, hackers can access the cameras by connecting to the shared network and acquire the sensitive video data, or replace video images sent from the camera to the NVR or viewing station. One possible scenario is where a hacker replaces video images sent from the camera to the NVR or viewing station, which is generally known as "spoofing." Other scenarios include the covert viewing of the video stream, or "snooping."

Therefore, there is a need to devise more secure video surveillance systems.

SUMMARY

Certain embodiments of a device or system described herein provides for high security delivery of real time video (e.g., high definition (1080p)) and control data over an IP network. Embodiments of the invention provide methods and systems that may be used in discriminating genuine images or video from compromised or fraudulent images or videos. In certain embodiments, methods are provided to generate authentication information that is processed concurrently with the images or videos and is used in validation of transmitted images or videos. In certain aspects the data provided by the system/device contains an authentication signature or unique identifier. The authentication signature or unique identifier can be used to validate and verify the veracity of the data being gathered and transmitted, as well as ensure the data is being securely transmitted. The system/device can be configured to meet various encryption and data validation standards, e.g. United States Government standards. In certain aspects the system/device transmits secured data to one or more end user. In other aspects the system/device is configured to inhibit spoofing and/or snooping of the data transmission. In one embodiment the authentication signature is encrypted prior to transmission from the authentication information transmitter. The authentication signature is then decoded at the security gateway and processed. In other embodiments the authentication signature is transmitted unencrypted. The authentication signature can then be encrypted once received by the security gateway.

In certain aspects a device/system functions as an NTSC/PAL/SMPTE video encoder and data encryption unit allowing existing non-secure IP video and building control resources to be secured. In a further aspect the system/device is programmed to provide encryption and Public Key Infrastructure (PKI) support combined with secure boot, secure clock, and a tamper proof enclosure capable of zeroizing memory—the tamper proof enclosure can be used for the authentication information transmitter, the imaging device, and/or the security gateway. In cryptography, zeroization is the practice of erasing critical security parameters (CSPs) (electronically stored data, cryptographic seed keys and shared secrets) from a cryptographic module to prevent their disclosure if the equipment is captured or compromised, which is typically accomplished by altering or deleting the contents to prevent recovery of the data.

The device can include a high bandwidth gigabit network interface that supports the ability to communicate unicast or multicast over existing TCP/IP backbones using category 6 cables or optional small form factor pluggable (SFP) based multi-mode or single mode fiber optic connections. Certain embodiments can also support a second network input port for securing existing unsecured IP devices.

In certain aspects the device/system can deliver video at full frame rate for up to two simultaneous and individually configurable streams. The device can support robust encoding, frame rates and configuration parameters such as constant or variable bit rate, H.264 Main or High encoding profiles, and multi-streaming with variable frame rates. The device/system can be configured for audio streaming, serial data transfer, and/or controlling pan-tilt-zoom (PTZ) cameras as well as building automation devices. The device/system can optionally provide embedded video analytics and deliver analytic metadata securely.

Certain embodiments are directed to a monitoring system comprising 1, 2, 3, 4, or more authentication information transmitter or transmitters, a monitoring device, and a security gateway. The authentication information transmitter is positioned in a location to be monitored so that authentication information transmitted by the authentication information transmitter, which may or may not be encrypted, can be received by the monitoring device, i.e., the authentication information transmitter and monitoring device are operatively coupled. In certain aspects the authentication information transmitter can transmit other information such as time-based codes for messages related to maintenance status or synchronization that can be used to assess and monitor device status, low battery messages, voltage messages, re-pairing, and resynchronization. The monitoring device is configured to capture an image or video in conjunction with authentication information and to transmit the captured image or video and authentication information (encrypted or not, having been processed or in raw form) to a security gateway, the security gateway being configured to receive, further process, and transmit the processed image or video.

In certain aspects the authentication information transmitter, the monitoring device, and/or the security gateway comprises a global positioning (GPS) unit. In a further aspect the GPS provides coordinates for the location of the authentication information transmitter, monitoring device, or security gateway. In another aspect the location coordinates are encoded by firmware in the authentication transmitter, monitoring device, and/or security gateway.

In a further aspect the authentication information transmitter, monitoring device, and/or security gateway comprises a control unit programmed to provide and/or receive one or more time codes, which can be provided by a secure real time clock (RTC); location code, which can be encoded in firmware and/or provided by a GPS unit; and an unpredictable coded signal. In certain aspects the authentication information comprises an unpredictable coded signal that is visual, non-visual, or both visual and non-visual. In certain aspects the coded signal comprises a non-visual coded signal, e.g., in the non-visual ultraviolet or infrared spectrum. The non-visual information can be provided as a non-visual ultraviolet signal. In other aspects the authentication information can be provided as a non-visual infrared signal. In certain aspects a non-visual signal can be provided in conjunction with a visual signal. In still a further aspect the authentication signal can be a visual signal. Information provided by the authentication information transmitter provides an identifier unique to that particular transmitter device. In certain aspects the authentication information transmitter comprises a control unit programmed to provide an unpredictable coded signal. The authentication information transmitter can be configured to generate unpredictable non-visual authentication information that identifies a particular location at a particular time or time period. In certain aspects spatial location information can be provided, by the authentication transmitter and/or the monitoring device, to ensure the monitoring device or authentication information transmitter has not been moved or compromised.

In certain aspects the monitoring device is an imaging device configured to receive visual and non-visual information, e.g., camera or detector array. The system can further comprise a reflector that is configured to direct authentication information to a monitoring device that is configured to receive the authentication signal via the reflector.

The security gateway can comprise a control unit programmed to perform one or more steps of processing an image or video, validating identifying information provided by the monitoring device, performing image subtraction and fill for the purpose of masking the authentication signal (e.g. like a silent bank alarm) from the view of the operator, time coding, image or video encoding, or encrypting the image or video output.

In certain aspects the security gateway will transmit a processed signal to a client. FIG. 3 illustrates an embodiment of a client for receiving the data generated by a system as described herein. The client receives a transmission from the security gateway. The client is configured to provide a decryption function, a validation function, an image addition function, a display function, an image decoding function, and a storage function. Once the transmission from the security gateway is process it can be stored and/or displayed.

Certain embodiments are directed to methods of processing an image or video of a monitored location comprising: receiving an image or video comprising non-visual authentication information generated by a monitoring device, wherein the authentication information is transmitted by an authentication information-transmitting unit and captured by the monitoring device; processing the image to generate an encrypted authenticated image or video; and transmitting the processed image to a monitoring unit. In certain aspects the security gateway can be configured to process alerts and alarms that may be generated by the system in response to tampering, security breach, security threat, malfunction, and the like. The method of processing can further comprise validating image and/or video. Processing can include time coding the image and/or video. In certain aspects processing the image and/or video includes performing image subtraction and fill. Processing can further comprise encoding the image and/or video for transmission by the security gateway. In certain aspects the security gateway can encrypt the image and/or video. The security gateway can be configured to validate monitoring device position (physical location), spatial integrity, operational integrity, and the like. If the monitoring device position (physical location), spatial integrity, operational integrity, and the like are not validated the security gateway can be programmed to provide an alarm or alert message. The alarm or alert can include, but is not limited to an audible alarm, an email, a text message, and/or a visible display (e.g., blinking lights, graphic on a computer screen or other device). Based on the analysis of the data and output of the validation scheme the security gateway can be configured to interrupt the data output (i.e. stop sending video/data) or alert the client(s) of tamper or non-verifiability of the input signal (i.e. provide an alarm or alert).

Certain embodiments are directed to an authentication device (i.e., an authentication information transmitter). An authentication device can comprise one or more authentication information generators, a secure device housing or case, a time coding device, a driver for the non-visual and/or visual information generation, a battery for power when located away from a power source, a GPS device or set of coordinates, firmware containing the authentication algorithms, and a unique device identifier. In certain embodiments the authentication device is position in a location to be monitored, i.e., is field deployed. The authentication device can be configurable to be integrated in a variety of monitoring systems and to be compatible with a number of imaging devices.

Other embodiments are discussed throughout this application. Any embodiment discussed with respect to one aspect applies to other aspects as well and vice versa. Each embodiment described herein is understood to be embodiments that are applicable to all aspects of the invention. It is contemplated that any embodiment discussed herein can be implemented with respect to any method or composition of the invention, and vice versa. Furthermore, software and/or firmware encoded programs can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

Figure 1:
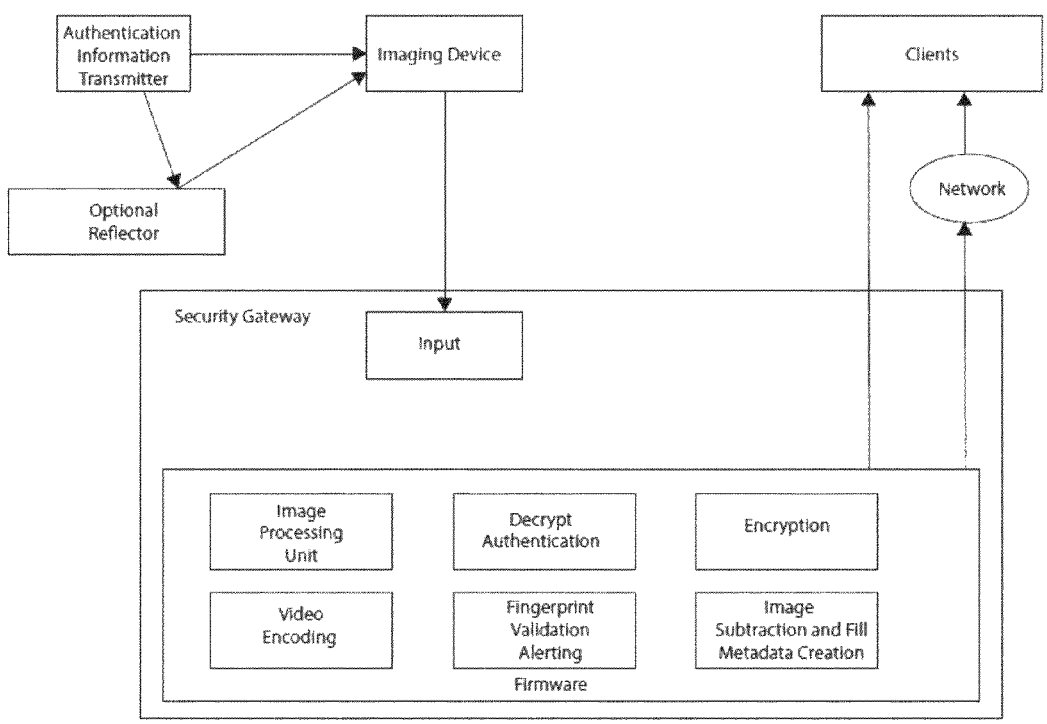
FIG. 1. Illustrates one embodiment of a monitoring system comprising an authentication information transmitter, monitoring device, security gateway, and client.

Embodiments of a monitoring system are illustrated in FIG. 1. The system comprises an authentication information transmitter, a monitoring device, and a security gateway. In certain aspects the system will be in communication with a client. The monitoring device will be employed to monitor a location or area of interest. An "area of interest" or location refers to any region where viewing or monitoring is desired. The location or area of interest can be all or part of a room, a hallway, an entrance, a gate, an area inside of a building, an area outside a building, and the like that can be monitored by a monitoring device. In certain aspects the monitoring device comprises an imaging device. An imaging device may include any combination of hardware/software/firmware, detector(s), image processing systems, etc. capable of capturing some form of image (e.g., a digital image) of the environment within its field of view. An imaging device can be an optical device (video camera), a thermal (infrared) imager, or any other imaging device. In certain aspects the imaging device is a camera. In certain aspects the imaging device will comprise a detector for non-visual authentication signals.

The monitoring device will be configured such that authentication information transmitted by the authentication information transmitter can be gathered or detected by the imaging device concurrently with monitoring a location or area of interest. An image can be a video and may include audio from an area of interest. Data transmitted by a monitoring device can include an image and additional information, including, but not limited to a device identifier, time, location, etc. The image and additional information can uniquely identify a particular area of interest from a particular spatial position at a particular time or during a particular time period. An image is received by an imaging device, which may include sensors such as photoelectric conversion elements (e.g., CCDs), and can be converted into an image signal. An image signal, including authentication information, can be converted to a digital signal by an ADC (Analog-to-Digital Converter).

Figure 2:
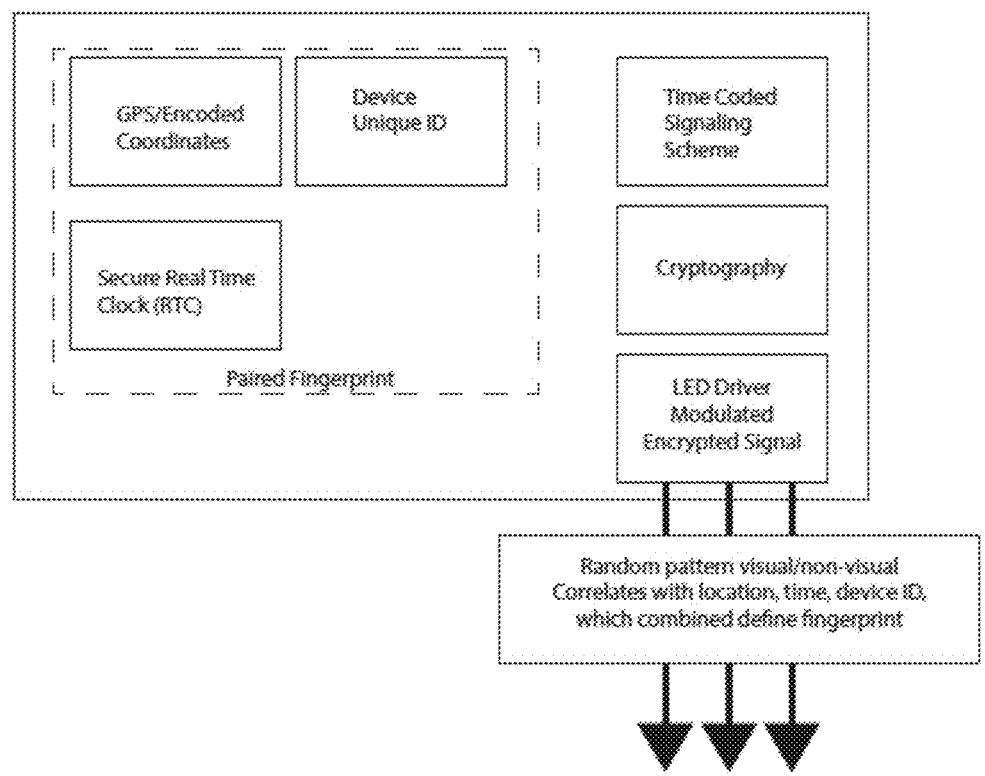
FIG. 2. Illustrates one embodiment of an authentication information transmitter.
Figure 3:
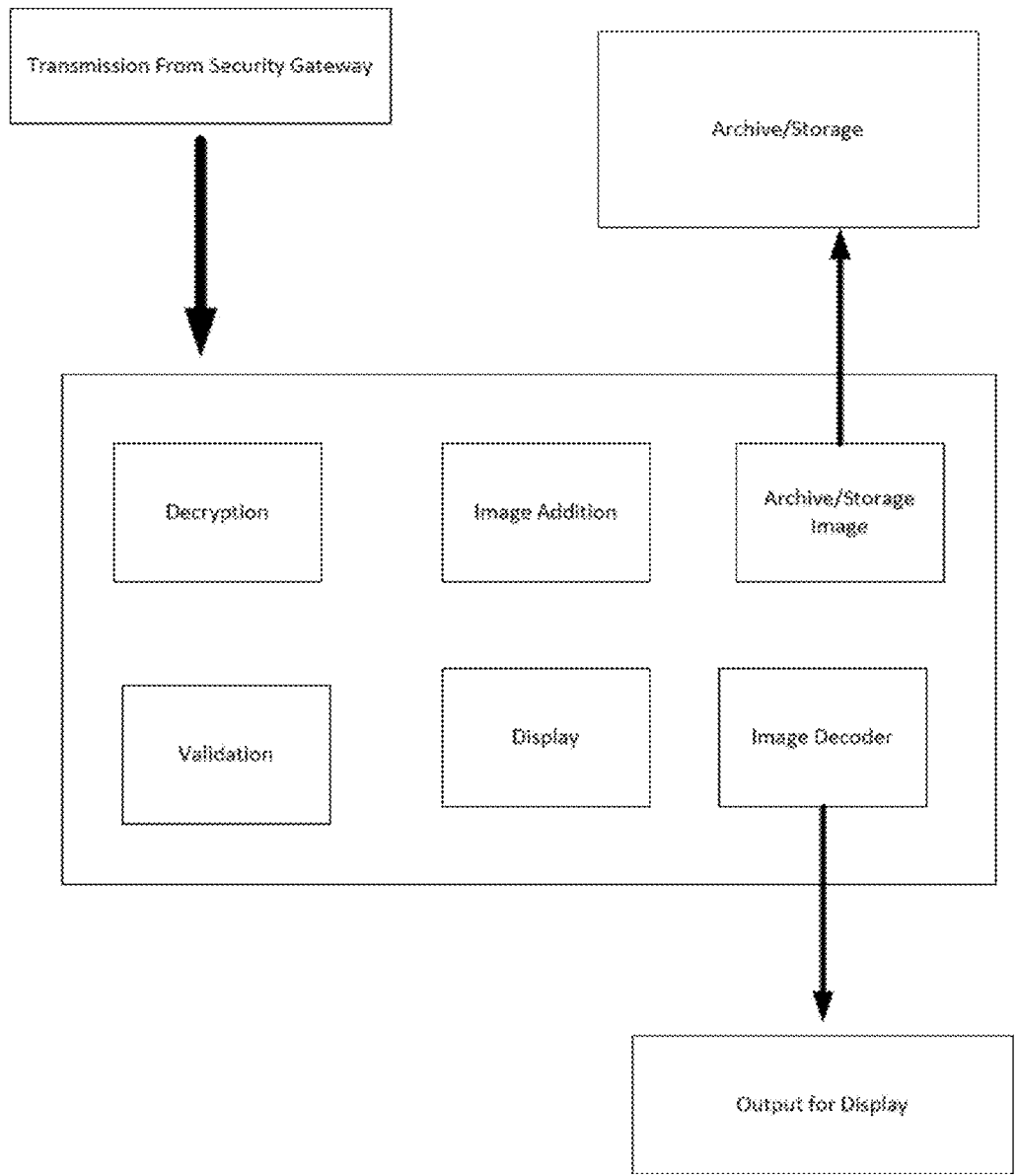
FIG. 3. Illustrates one embodiment of receiving and displaying a processed signal.

Authentication information can be generated by the authentication information transmitter. FIG. 2 illustrates an embodiment of an authentication information transmitter that is configured to provide a position via a global positioning system or firmware encoded coordinates, a secure real time clock function, time coding function, a validation function, and one or more signal sources. In certain aspects all or part of the authentication information provided by the device is unpredictable, produced by the signal source, and presented in the view of or detected by the imaging device and serves to authenticate a particular scene or image. The authentication signal can be directly transmitted to the imaging device or reflected from a surface that is in view of the imaging device, e.g., a reflector or reflecting surface. Authentication information can take the form of unpredictable visual and/or non-visual signals. Visual signals refer to any portion of the electromagnetic spectrum that can be perceived by the human eye. Non-visual signal refers to any portion of the electromagnetic spectrum that can be detected by a sensor and not the human eye, including the infrared (IR) and ultraviolet (UV) portions of the electromagnetic spectrum. Electromagnetic radiation with a wavelength between 380 nm and 760 nm is detected by the human eye and perceived as visible light. Non-visual wavelengths include near infrared (longer than 760 nm to shorter than 1 mm) and ultraviolet (longer than 10 nm to shorter than 380 nm). In certain aspects the imaging device has a second detector for non-visual signals that are integrated with the image: alternatively the imagining device can image electromagnetic radiation within and outside the visible spectrum.

The authentication information transmitter illustrated in FIG. 2 can be used to implement a time coded signaling scheme where the codes generated are based off a seed key (paired fingerprint) that is then passed through cryptography by the transmitter device such that the time coded signal is encrypted to protect it further and prevent someone from sitting and studying the code to reverse engineer it.

Figure 4:
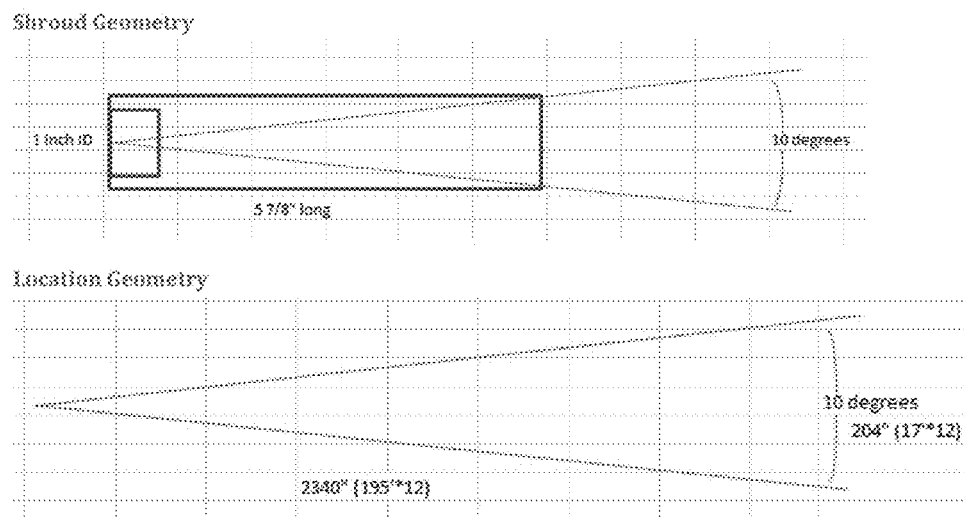
FIG. 4. Illustrates one embodiment of a shroud for the signal source.

In certain aspects the authentication information transmitter's signal source can be comprised of a plurality of light sources. In a further aspect the light sources can be arranged in an ordered array with the same or variable frequencies. The light sources can be light emitting diodes (LED) or other tunable electromagnetic generating devices. In certain aspects the light source is capable of generating frequencies needed to achieve the coded signal, can be modulated to create a signal, and the signal generated is detectable by the imaging device or an auxiliary detector. The light sources are configured to generate a number of image device-detectable unpredictable patterns or signals having a range of wavelengths from 10 nm to 1 mm. In certain aspects the authentication information can comprise both visual and non-visual signals. In certain aspects the unpredictable information comprise pattern, wavelength, or both pattern and wavelength. The unpredictable information can vary over time or vary in discrete time limited periods. In certain aspects a light source can comprise high power LEDs (700 mA+). In certain aspects optics are added to the LED's to focus the beam pattern of the light. The lenses themselves are commercially available. The active transmitter device can support single LED or multiple LED arrays that can be organized or purposefully placed in an unorganized pattern to aid the receiver side finding/locating algorithm. In certain aspects a tube/shroud can be placed in front of the LEDs to further focus the light beam pattern (for one example see FIG. 4).

The image including the authentication information for an area of interest is transmitted to a security gateway for further processing. In certain aspects the imaging device processes image(s) received, which include authentication information from the authentication information transmitter.

Processing by the imaging device can include the subtraction of the authentication information. Image subtraction and fill process includes the extraction and translation of the authentication information (i.e. image subtraction) into metadata that is the authentication information stripped out of the picture and then sent on to the gateway as other than the encoded video stream. The image is filled so that the client sees just the image without the authentication information. The authentication information can be reviewed or reversed by using information provided by metadata.

In further reference to FIG. 1 the security gateway receives the signal from the monitoring device via an input interface. The input interface can be wired and/or a wireless interface. The security gateway is configured to process the image via various processing modules. The processing can include one or more of validating the image, coding the image, performing image subtraction and fill, encoding an image, and encrypting an image. In certain embodiments the processing occurs in order of (i) image processing; (ii) video encoding; (iii) decrypt authentication; (iv) fingerprint validation and alerting; (v) image subtraction and fill, (vi) metadata creation, and encryption. The processed image is transmitted via an interface to a client that displays an image, analyzes an image, stores an image, etc. In certain aspects a replay attack (i.e., the looping or replay of an image or video captured at one time and played at a later time in place of the image or video representing the latter time) can be averted by confirmation of time coding of the image or video (i.e., using a detection algorithm). The time component would not agree if a previously recorded image or video is transmitted at a later time, the client decoder would identify the bogus transmission because the time code would be off as would the authentication signal for the current time. In other aspects the presence or absence of other components of an authentication can also be used to identify suspect data. For example, an image set is time coded and didn't include the light source information. In this case a skilled attacker could generate a loop of video with the time data that was spoofed and just keep the timing going while the imagery was stale. Insertion of a light signal, which also has its own time component, would detect such an attack and would avoid such vulnerability.

In certain aspects the detection algorithm is post encoding. Post encoding aspects can result in a more simplified deployment (e.g., more integration ready with a wider array of off the shelf cameras and encoders). In certain aspects the authentication signal is encrypted and the receiver implements decryption into its processing chain.

The authentication information transmitter will also have a tamper response mechanism that will detect attempts to open the device and in response to those intrusions will delete the critical security parameters in the device (seed keys, encryption keys, etc.). In addition to the time based codes that will be sent for authentication the device will also implement other messages for maintenance purposes and resynchronization purposes. These will allow for things like device health, low battery messages, voltage messages, re-pairing and resynchronization.

In certain aspects the data is secured or the connection between the monitoring device and security gateway is secured. The authentication signal can provide security between the monitoring device and the security gateway, wherein confirmation of the authentication signal verifies the security of the data or modification thereof indicates potential compromise of the data. Another component of security is in the expected answer at the security gateway. In certain aspects each component is programmed with a checkpoint such that the next time a signal will be "agreed" to or confirmed by both the transmitting and receiving components via a portion of the previous transmission. Additional methods of protecting data integrity can include monitoring the presence of any signal (e.g. video loss). Interruptions in that signal can indicate possible tampering.

The image processor generates a video signal that is composed of a brightness signal and color-difference signal by means of conventional signal processing techniques (color separation, gamma correction, etc.). The video signal is transmitted to a compressor. The compressor compresses the video signal by a compression process employing discrete cosine transform (DCT) (e.g., MPEG2, JPEG, etc.) and thereby generates a coded video signal. The coded video signal is buffered in a buffer, transmitted by an interface (I/F), and transferred to the controller via the LAN.

The receive side detection algorithm can be configured to integrate with moving cameras (pan tilt zoom (PTZ)) by comprising an algorithm to find the authentication information transmitter in a scene then track that object through a moving scene.

The receiver side can be configured to allow for multiple authentication information transmitters to be supported such that one could place them in quadrants of the PTZ camera field of view so that no matter the physical orientation of the camera there should be at least one transmitter input to the camera for authentication.

In certain aspects the authentication information transmitter input can be combined with a reference image for the scene such that an attacker could not take the video signal that included authentication data and overlay just the authentication data onto a new video scene.

In certain embodiments systems and devices can comprise one or more processor, circuit board, memory, operating system, debug/programming interface, storage, networking interface, video input/output, audio input/output, and power component(s).

In certain aspects the device components will be contained in an enclosure. In certain aspects the enclosure will be a secure enclosure that hinders physical access to the device components. The device enclosure can be constructed for outdoor deployment and resistant to harsh and dirty environments. The device can be configured for use in indoor and outdoor electrical enclosures.

A device enclosure will include external indicators, such as LED indicators. In one embodiment the indicator can provide for one or more of an "ON" indicator, an "INITIALIZING" indicator, an "ERROR" indicator, and an "OFF" indicator. One or more indicators can be provided for one or more device functions, including but not limited to the function of the cryptographic engine, application firmware, power, and input/output interface.

In certain aspects the device is constructed to provide protection against environmental factors or provide functionality under such environmental conditions, such as, but not limited to humidity and temperature. The device can be constructed to support industrial operational temperature ranges of −40 to 70 degrees Celsius (including all values and ranges there between) and provide for operation in 10-90% relative humidity, including all values and ranges there between. In a further aspect the device constructed to be stored in relative humidity of 5-95%, including all values and ranges there between.

The system/device can comprise one or more firmware components or features. In certain aspects device configurations can be accomplished via a secure web page served up by the device.

Low Level Device Drivers—In certain aspects the system/device can provide (i) configuration and control over I/O, including but not limited to circuit configuration (input type) and control configuration (output type); (ii) configuration and control over audio; (iii) configuration and control over crypto seeding (in certain aspects the crypto seeding is limited to the manufacturing process, i.e., crypto seeding is not done in the field); support the SATA interface for local video storage and data writing; (iv) support over the wire/air firmware updating.

Encoding Profiles and Imagery Control—In certain aspects the device is configured to support or provide one or more of the following: (i) support MJPEG; (ii) support MPEG4 part 10 H.264/AVC (including baseline profile and main profile); (iii) support independently configurable streams (settings and codec type) and up to two output streams per video input; (iv) provide the ability to set the video output mode of the streams to ONVIF, RTSP; (v) support the ability to configure the parameters for each stream, including frame rates, resolution (176×120 to 1920× 1080), compression, rotation, mirroring, ability to correct the aspect ratio, video effects (i.e. overlays) (H.264 specific—GOP size/I-frame distance, Bit rate control parameters (VBR, CBR), ability to choose limiting frame rate or video quality to meet CBR configured; and MJPEG specific—maximum frame size limit with the ability to compress image to meet user configuration, ability to down sample images); (vi) support the ability to configure the video inputs with the following transforms (Brightness, Color Level, Contrast, Hue, Black and White, De-Interlacing (4CIF), Noise Reduction, etc.); and (vii) support automatic transitions to day/night based on a schedule.

Networking Stack and Supported Protocols—In certain aspects a system/device can be configured to provide support for IPV4 and IPV6; capable of unicast or multicast (streaming) modes of delivery for video and the configuration shall be input independent; provide support for the following protocols and their configuration parameters: (i) DHCP, (ii) NTP (The device shall be able to synch with external time servers, The device shall also be able to keep time without external servers, The device shall provide capability of implementing daylight savings policies, The device shall keep time in UTC then show time in local zone (configurable) with any applicable DST offsets, (iii) HTTP and HTTPS (Ability to import certificates shall be supported, Ability to create/generate a self-signed certificate shall be supported), (iv) 802.1x-2010 (RADIUS with MACSec) (EAPOL v1 and v2 shall be supported), and (v) RTP/RTSP; support IP Address Filtering for up to 512 listed addresses or a range of addresses input via configuration; support the ability to configure the following networking parameters ((i) IP Addresses, (ii) Subnet Mask, (iii) Default Gateway, (iv) Multicast streaming mode, (v) DHCP on/off, etc.); support the ability to define users and access levels for configuration within the device; support input from an IP device via the secondary 10/100 network interface, the input shall be configurable with MAC filtering locked for use only by the address of the attached client. Data input from this device shall not be manipulated, but passed to the crypto engine for packaging and secure delivery across the network; support the ability to configure the secondary network input port as IP Crypto device or HDcctv encoding input; etc.

In certain aspects the system/device can be configured to provide support for 128-bit and 256-bit AES standards, implement all security features of the processor including High Assurance Boot, Secure RTC, NIST certified RNG and zeroizable memory based on intrusion. In certain aspects the firmware used for crypto functions must be segmented from rest of application space so that continued development can occur around the crypto engine while maintaining certification integrity, i.e., providing a crypto boundary.

Application Programming Interface—In certain aspects the system/device can be configured to provide for a software program for decryption that can be installed on Windows 7, Server 2008 O/S and be capable of easy integration into a Java7 environment (Java Virtual Machine), a software program that includes definition of an API for use in integrating all data outputs from the software module into other applications (e.g., the API shall define all functions in a manual, and provide sample applications and sample code.)

Regulatory and Standards Considerations—In certain aspects a system/device can be configured to conform to UL 60950 and UL/CE 62368 standards and successfully obtain the markings, conform to FIPS 140-2 (level 3) and obtain NIST certification of cryptographic functions as well as CAVP/CMVP from a certified independent test laboratory, comply with 47 CFR FCC Part 15, sub part B, Class B, conform to and support ONVIF (v2.0) Profile S as an NVT (Network Video Transmission Device), conform to and support HDcctv (v2.0), comply with RoHS and be manufactured in the USA.

Embodiments of system or methods described herein may be implemented or executed by one or more computer systems. In various embodiments, a system may be an authentication information transmitter, a monitoring device, a security gateway, or more generally a server, a mainframe computer system, a workstation, a network computer, a desktop computer, a laptop, a mobile device or the like. For example, in some cases, the system or methods described herein may be implemented as computer system. Moreover, one or more systems or devices may include one or more computers or computing devices generally in the form of the system as described. In different embodiments various computer systems or components may be configured to communicate with each other in any suitable way, such as, for example, via a network.

A system includes one or more processors coupled to a system memory via an input/output (I/O) interface. A system further includes a network interface coupled to I/O interface, and one or more input/output devices, such as a monitoring device, a cursor control device, a keyboard, a display(s) and the like. In certain embodiments multiple devices make up the system and each device may be configured to host different portions or instances of embodiments or functions of the system. For example, some elements may be implemented via one or more devices of the system that are distinct from those devices implementing other elements.

In various embodiments, a system may be a multi-processor system including two or more processors (e.g., two, four, eight, or another suitable number). The processors may be any processor capable of executing program instructions. For example, in various embodiments, processors may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors may commonly, but not necessarily, implement the same ISA. Also, in some embodiments, at least one processor may be a graphics-processing unit (GPU) or other dedicated graphics-rendering device.

System memory may be configured to store program instructions and/or data accessible by one or more processors. In various embodiments, the system memory may be implemented using any suitable memory technology, such as static random access memory (SRAM), synchronous dynamic RAM (SDRAM), nonvolatile/Flash-type memory, or any other type of memory. Program instructions and data implementing certain operations, such as, for example, those described herein, may be stored within system memory as program instructions and data storage, respectively. In other embodiments, program instructions and/or data may be received, sent or stored upon different types of computer-accessible media or on similar media separate from system memory or computer system. Generally speaking, a computer-accessible medium may include any tangible storage media or memory media such as magnetic or optical media—e.g., disk or CD/DVD-ROM coupled to computer system via I/O interface. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via a network interface.

In certain embodiments, an I/O interface may be configured to coordinate I/O traffic between processor, system memory, and any peripheral devices, including network interface or other peripheral interfaces, such as input/output devices. In some embodiments, an I/O interface may perform any necessary protocol, timing or other data transformations to convert data signals from one component (e.g., system memory) into a format suitable for use by another component (e.g., processor). In some embodiments, an I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of an I/O interface, such as an interface to system memory, may be incorporated directly into a processor.

A network interface may be configured to allow data to be exchanged between a system and other devices on a network, such as other computer systems, other devices, or between nodes of a computer system. In various embodiments, a network interface may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices may, in some embodiments, include one or more display terminals, keyboards, keypads, touch screens, scanning devices, voice or optical recognition devices, or any other devices suitable for entering or retrieving data by one or more systems. Multiple input/output devices may be present in a system or may be distributed on various nodes of the system. In some embodiments, similar input/output devices may be separate from the system and may interact with one or more nodes of the system through a wired or wireless connection, such as over a network interface.

Memory may include program instructions, configured to implement certain embodiments described herein, and data storage, comprising various data accessible by program instructions. In certain embodiments, program instructions may include software elements of embodiments described herein. For example, the program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. Other or different software elements and data may be included.

A person of ordinary skill in the art will appreciate that the system and method described herein are merely illustrative and is not intended to limit the scope of the disclosure. In particular, the system and devices may include any combination of hardware or software that can perform the indicated operations. In addition, the operations performed by the components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other system configurations.

The examples provided herein, as well as the figures, are included to demonstrate certain embodiments of the invention. It should be appreciated by those of skill in the art that the systems, devices, methods, and techniques disclosed in the examples or figures represent those identified by the inventors to function well in the practice of the invention, and thus can be considered to constitute modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A scene monitoring system comprising: a scene authentication information device comprising a light source configured to produce scene authentication information transmitted by visual or non-visual light within the electromagnetic spectrum from infrared to ultraviolet, wherein the scene authentication information identifies a particular location and a particular time or time period, the scene authentication information device being positioned within a scene being monitored by an imaging device, the imaging device coupled to a security gateway, wherein the scene authentication information device is configured to transmit authentication information to be received by the imaging device concurrently with image or video detection by the imaging device, and wherein the security gateway is configured to receive the authentication information from the imaging device in the form of an image or video accompanied by scene authentication information, and determine whether the imaging device or data transmitted from the imaging device has been corrupted or compromised.

2. The monitoring system of claim 1, wherein the authentication information device further comprises a global positioning unit.

3. The monitoring system of claim 1, wherein the authentication information device comprises a control unit programmed to provide one or more of a time code, location code, or a random non-visual code.

4. The monitoring system of claim 1, wherein the authentication information device comprises a control unit programmed to provide a non-visual coded signal comprising authentication information.

5. The monitoring system of claim 1, further comprising a spatial component to indicate imaging device perspective and to authenticate that the imaging device has not been moved or compromised.

6. The monitoring system of claim 1, wherein the imaging device is a camera configured to receive visual and non-visual information.

7. The monitoring system of claim 1, further comprising a reflector that is configured to direct authentication information to the imaging device that is configured to receive the authentication signal.

8. The monitoring system of claim 1, wherein the security gateway comprises a control unit programmed to perform one or more of processing the image or video, validating authentication information provided by the imaging device, performing image subtraction and fill, time coding, image or video encoding, or encrypting the image or video output.

9. A method of processing an image or video of a monitored location comprising:
receiving an image or video comprising non-visual authentication information generated by an imaging device, wherein the scene authentication information identifies a articular location and a s articular time or time period, wherein the authentication information is transmitted by an authentication information device comprising a light source configured to produce scene authentication information transmitted by visual or non-visual light within the electromagnetic spectrum from infrared to ultraviolet and captured by the imaging device concurrently with an image or video of the location; processing the image to generate an encrypted authenticated image or video; and transmitting the processed image to a monitoring unit, the imaging device coupled to a security gateway, and wherein the security gateway is configured to receive the authentication information from the imaging device in the form of an image or video accompanied by scene authentication information, and determine whether the imaging device or data transmitted from the imaging device has been corrupted or compromised.

10. The method of claim 9, wherein processing further comprises validating the image or video.

11. The method of processing an image of claim 10, further comprising generating an alert or alarm if the image being processed fails validation.

12. The method of claim 9, wherein processing further comprises time coding the image or video.

13. The method of claim 9, wherein processing further comprises processing the image or video by performing image subtraction and fill.

14. The method of claim 9, wherein processing further comprises encoding the image or video.

15. The method of claim 9, wherein processing further comprises encrypting the image or video.

16. An authentication device, comprising:
a light source configured to produce light transmitting scene authentication information transmitted by visual or non-visual light within the electromagnetic spectrum from infrared to ultraviolet, wherein the scene authentication information identifies a particular location and a particular time or time period;
at least one hardware processor; and
a memory coupled to the at least one processor, the memory configured to store program instructions executable by the at least one processor to cause the system to:
generate authentication information, and transmit the authentication information so that it is detectable by an imaging device, the scene authentication information transmitter being positioned within a scene being monitored by an imaging device, the imaging device coupled to a security gateway, and wherein the security gateway is configured to receive the authentication information from the imaging device in the form of an image or video accompanied by scene authentication information, and determine whether the imaging device or data transmitted from the imaging device has been corrupted or compromised.

* * * * *